Figure 1:
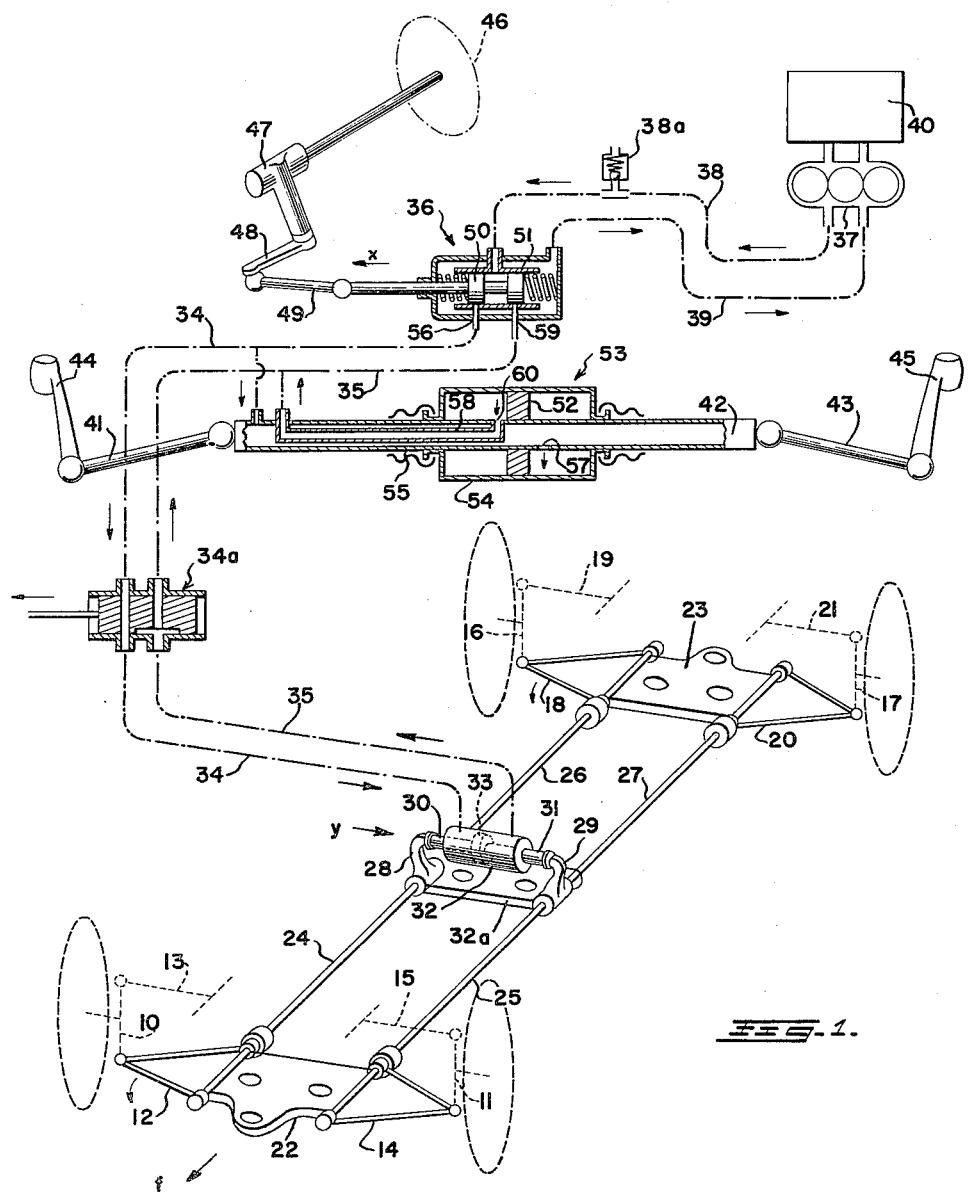

Aug. 29, 1961   J. MÜLLER ET AL   2,998,263
SPRING SUSPENSION, STEERING AND ANTI-ROLL MEANS FOR VEHICLES
Filed June 18, 1956   2 Sheets-Sheet 1

INVENTORS
Josef Müller
Hans-Joachim M. Förster

BY *Dicke and Craig.*

ATTORNEYS

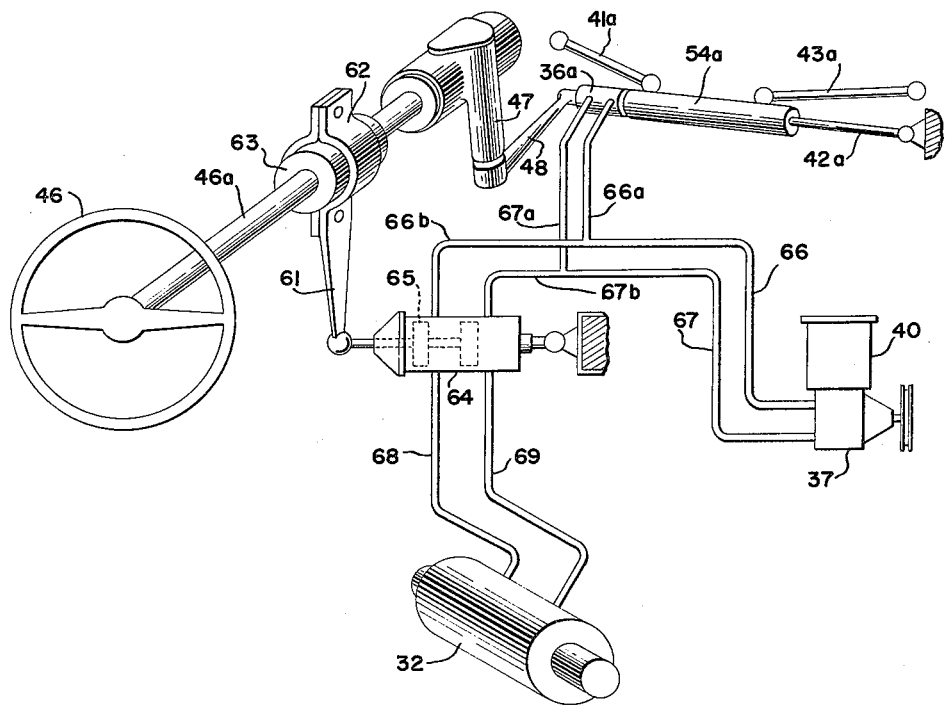

United States Patent Office 2,998,263
Patented Aug. 29, 1961

2,998,263
SPRING SUSPENSION, STEERING AND
ANTI-ROLL MEANS FOR VEHICLES
Josef Müller, Stuttgart, and Hans-Joachim M. Foerster, Stuttgart-Bad Cannstatt, Germany, assignors to Daimler-Benz Aktiengesellschaft, Stuttgart-Unterturkheim, Germany
Filed June 18, 1956, Ser. No. 591,840
Claims priority, application Germany June 24, 1955
6 Claims. (Cl. 280—112)

This invention relates to spring suspension, steering and anti-roll means for vehicles and has for an object to provide spring suspension means in connection with means for opposing side roll of the vehicle on curves and has for an important object the provision of a simple, practical and effective means to effect the required functions.

Another object is to provide such means in a vehicle having servo steering means in which the power source for servo steering is also employed to operate the anti-roll or curve stabilization means.

A further object is to provide such means in a vehicle having fluid pressure servo means in which the fluid pressure source for the servo steering means is also employed to operate the anti-roll or curve stabilization means.

A further object is to provide such means in a vehicle having servo steering means in which the power source for servo steering is also employed to operate the anti-roll or curve stabilization means and in which a single servo control means is used to control both steering and curve stabilization whereby the adjustment of the stabilization means may be readily made proportional to the adjustment of the steering mechanism.

Another object is to provide for disabling the adjustment of the stabilization mechanism at will.

Another object is to provide such an arrangement in which the curve stabilization means are operated prior to the time when steering adjustment takes place so that tilting of the vehicle body toward the center of curvature is attained before the curve is entered.

Another object is to provide such an arrangement in which the control means for curve stabilization is operated by the manually adjusted steering means such as the steering post preferably through friction clutch means.

Other objects will become apparent from the following description taken in connection with the attached drawings showing several illustrative embodiments of the invention and wherein:

FIG. 1 illustrates more or less schematically one form of embodiment of the invention having common control means for controlling steering and curve stabilization; and FIG. 2 is a schematic representation of a modified form of embodiment.

Referring to FIGURE 1, the wheel carriers 10 and 11 of the front wheels are each carried by two superposed guide links 12, 13 and 14, 15 connected to the vehicle frame or to the vehicle superstructure. In the same way, the wheel carriers 16, 17 of the rear wheels are carried by superposed guide links 18, 19 or 20, 21. The guide links may be connected to special auxiliary frames 22, 23 which are connected elastically with the vehicle superstructure as, for example, the main frame or the body and which may at the same time serve as a support for the driving motor.

The lower guide links of each wheel are spring supported relative to the frame or the vehicle superstructure by means of torsion bars 24, 25 or 26, 27 arranged in the axis of swing of the lower guide links 12, 14, 18 and 20 and arranged longitudinally of the vehicle whereby the springs at their ends away from the guide links have fixed thereto levers 28 and 29 bearing against piston rods 30 and 31 of a power actuator comprising a piston 33 shiftable in a transverse cylinder 32. Said piston may be biased to its central position by springs (not shown). The cylinder 32 as well as the levers 28 and 29 are desirably supported on a carrier 32a which is attached elastically to the vehicle frame or superstructure; for example, through the interposition of rubber buffers. Tubes 34 and 35 are connected to the spaces on either side of the piston 33 and connect to a control means 36. The latter is connected through conduit 38 (containing pressure relief valve 38a) and the return conduit 39 with the oil container 40. From it pressure fluid is delivered to conduit 38 by means of a pump 37, preferably a duplex pump. Instead of the duplex pump 37, naturally one or two separate pumps or other fluid supply means may be provided. The control means 36 serves at the same time for controlling the vehicle steering which includes the three part linkage 41, 42, 43 which adjust the steering knuckles 44 and 45 and the wheel carriers 10 and 11 of the front wheels. The control means 36 may be built together with the linkage part 42 so that it is carried thereby during movement of the part 42 to be described hereinafter.

The steering means is actuated by the steering wheel 46 by means of the friction drive steering gear 47 and the steering arm 48 which, through an intermediate link 49, adjusts the control piston 50 of the control valve means 36. The control piston is, for example, held in a middle position in the control cylinder 51 by means of two springs in such a manner that in the middle position the pressure conduit 38 is closed off from the conduit 34 as well as from the conduit 35. The intermediate rod 42 carries the adjusting piston 52 of the servo steering operating means 53 which consists of the piston 52 and the cylinder 54.

The interior of the cylinder 54 is in communication with the valve 36 through th ehollow piston rod 42 in that an outer conduit 55 therein connects the valve port 56 and the conduit 34 with a port 57 to the right side of the piston 52 and the inner conduit 58 connects with the valve port 59 and the conduit 35 with an opening 60 to the left of the piston 52.

A shut off arrangement, for example, a slide valve 34a, may interrupt the flow of oil through the conduits 34, 35, for the purpose of disabling the operation of the stabilizing arrangement when the vehicle is stationary or moving slowly. The slide valve 34a may be operated manually or automatically, for example it may be moved in the direction of the arrow whenever the vehicle speed drops below a certain value whereupon, the upper conduits are closed off and the lower conduits 34 and 35 are connected with each other.

The manner of operation of the described arrangement is as follows: if the vehicle enters a curve such as a right curve, the steering lever 48 has been so moved through operation of the steering wheel 46 that the control piston 50 is moved in the direction of the arrow $x$ so that pressure fluid passes from the conduit 38 through the port 56 into the conduit 34 and thereby to the right side of the piston 33 (on the left side in the drawing). The piston 33 is thereby moved to the left side of the vehicle as indicated by arrow $y$ whereby the springs 25 and 27 on the left side, namely the outer side of the vehicle running in the direction of the arrow $f$, are stiffened or supplementarily stressed, and the springs 24 and 26 on the opposite side of the vehicle namely on the inner side of the curve are relaxed so that the vehicle body tends to tilt toward the inside of the curve due to the resulting reaction forces.

At the same time, pressure fluid reaches, through the interior of the outer tube 55 and through the opening 57 to the left side of the steering piston 52 (i.e., to the right side in the drawing) which is thereby driven to the right (to the left in the drawing) and the steering wheels of the vehicle are adjusted for a right hand curve.

In the case of the modification shown in FIG. 2, a lever 61 is attached to the steering shaft 46a of the steering wheel 46 above the steering gear 47 by means of a clamping arrangement 62 and through the interposition of a replaceable friction collar 63 whereby the friction force may be varied through adjustment of the screws which hold together the clamping means 62. As in the example according to FIG. 1, the steering gearing 47 controls through the steering lever 48 a control valve means 36a which operates the three part steering linkage. In contrast to the example shown in FIG. 1, the piston rod is not formed as the middle parallel bar but the control cylinder 54a to which the side link rods 41a and 43a are connected constitutes said bar. The piston rod 42a is on the contrary attached to the frame pivotally but not longitudinally shiftably.

The lever 61 adjusts a valve piston 65 in valve cylinder 64 pivoted to the frame which piston operates similarly to the control piston 50 in the control means 36.

The pressure fluid, for example, pressure oil, is delivered from the container 40 through pump 37 to the pressure and return conduits 66 and 67 which split into branch conduits 66a, 66b and 67a, 67b. The conduits 66a, 67a lead to the control valve means 36a of the power steering, whereas the branch conduits 66b and 67b lead to the control valve cylinder 64 for the curve stabilization device. The conduits 68, 69 connect the control cylinder 64 with the spring adjusting cylinder 32 for the curve stabilization means.

The manner of operation is generally the same as in the case of FIG. 1 with, however, the difference that the servo steering arrangement 54a and the curve stabilization 32 takes place through individual control means 36a or 64. Hereby it is possible to provide in a simple manner sequential control, for example, the means for curve stabilization (cylinder 32) become effective before the power steering arrangement (cylinder 54a). This can be effected thereby that the control through the valve piston 65 takes place during the idle movement of the steering wheel which is always present in the steering mechanisms. Therefore, during the first part of the turning movement of the steering shaft 46a, the curve stabilization is initiated and thereafter the steering takes place through the action of the steering drive 47. Thus, in both illustrated and described embodiments of the invention the power steering and the curve stabilization arrangement are both actuated by a single mode of operation of the steering wheel in a predetermined manner, but, in the arrangement of FIGURE 2 there is slight delay in the operation of the steering mechanism, permitting the curve stabilization arrangement to take effect before the vehicle actually enters a curve.

The invention is not intended to be limited to the two illustrative forms shown and described which are to be understood as illustrative only and not is limiting, as various changes in construction and arrangement may be made, all coming within the scope of the claims which follow:

We claim:

1. In a road vehicle having a superstructure and road wheels, some of the wheels being steerable, torsion-bar suspension means for springing said wheels relative to the vehicle superstructure, said torsion-bar suspension means comprising a torsion-bar for each of said road wheels, each said bar having one end conected to a respective wheel with said bar extending in the longitudinal direction of said vehicle superstructure toward the center of the latter, lever means connected to the opposite end of each of said bars, anti-roll curve stabilization means adapted at certain times to stiffen the spring means for the wheels at one side of the vehicle while relaxing the spring means for the wheels at the other side of the vehicle, said anti-roll curve stabilization means comprising power actuator means arranged near the center of said vehicle superstructure and connected to said lever means, fluid pressure power steering means for said steerable road wheels including manually operable means having a predetermined mode of operation for controlling said power steering means, a single source of pressure for operating said spring means and said steering means and separate valve means for controlling the action of said pressure fluid upon said power steering means and the power actuator means of said curve stabilization means, respectively, in response to operation of said manually operable maens in said predetermined mode of operation, said power actuator means being connected to said manually operable means only by pressure fluid means including the curve stabilization valve means, said separate valve means each having respective means for operatively connecting it to said manually operable means for sequential control of said valve means to render said curve stabilization means effective before actuation of said power steering means upon operation of said manually operable means.

2. In a road vehicle having a superstructure and road wheels, some of the wheels being steerable, suspension means for springing said wheels relative to the vehicle superstructure, anti-roll curve stabilization means adapted at certain times to stiffen the spring means for the wheels at one side of the vehicle while relaxing the spring means for the wheels at the other side of the vehicle, fluid pressure power steering maens for said steerable road wheels including manually operable means having a predetermined mode of operation for controlling said power steering means, a single source of pressure fluid for operating said steering means and for effecting stiffening and relaxing of said spring means and valve means for controlling the action of said pressure fluid upon said power steering means and said curve stabilization means in response to operation of said manually operable means in said predetermined mode of operation, said valve means including means acting separately and sequentially in response to operation of said manually operable means to cause actuation of the curve stabilization means before causing actuation of the power steering means.

3. In a road vehicle having a superstructure and road wheels, some of the wheels being steerable, suspension means for springing said wheels relative to the vehicle superstructure, anti-roll curve stabilization means adapted at certain times to stiffen the spring means for the wheels at one side of the vehicle while relaxing the spring means for the wheels at the other side of the vehicle, steering means for said steerable road wheels including manually operable means having a predetermined mode of operation for controlling said steering means through transmission means having some lost motion movement, a source of power for effecting stiffening and relaxing of said spring means and means for controlling the action of said power source upon said curve stabilization means, said last-mentioned controlling means being actuated by said manually operable means without lost motion movement in response to operation of said manually operable means in said predetermined mode of operation, whereby the curve stabilization means is actuated before the steering means is actuated.

4. In a road vehicle having a superstructure and road wheels, some of the wheels being steerable, suspension means for springing said wheels relative to said vehicle superstructure, anti-roll curve stabilization means adapted to stiffen said spring means for said wheels at one side of said vehicle while relaxing said spring means for said wheels at the other side of said vehicle, power steering means for said steerable road wheels including manually operable means having a predetermined mode of operation for controlling said power steering means, a single source of power for steering said vehicle and for effecting stiffening and relaxing of said spring maens, and means for controlling the action of said power source upon said power steering means and said curve stabilization means in response to operation of said manually operable means in said predetermined mode of operation, said manually operable means operating said control means for said power steering means through transmission means having lost motion movement and operating said control means for said curve stabilization means without lost motion movement for actuating the latter before actuating the former.

5. In a road vehicle having a superstructure and road wheels, some of the wheels being steerable, suspension means for springing said wheels relative to said vehicle superstructure, anti-roll curve stabilization means adapted to stiffen said spring means for said wheels at one side of said vehicle while relaxing said spring means for said wheels at the other side of said vehicle, power steering means for said steerable road wheels including manually operable means having a predetermined mode of operation for controlling said power steering means, a single source of power for steering said vehicle and for effecting stiffening and relaxing of said spring means, and means for controlling the action of said power source upon said power steering means and said curve stabilization means in response to operation of said manually operable means in said predetermined mode of operation, said manually operable means operating said control means for said power steering means through transmission means having lost motion movement and operating said control means for said curve stabilization means without lost motion movement for actuating the latter before actuating the former, and said manually operable means actuating said control means for said curve stabilization means through friction drive means.

6. In a road vehicle having a superstructure and road wheels, some of the wheels being steerable, suspension means for spring said wheels relative to the vehicle superstructure, anti-roll curve stabilization means adapted at certain times to stiffen the spring means for the wheels at one side of the vehicle while relaxing the spring means for the wheels at the other side of the vehicle, fluid pressure power steering means for said steerable road wheels including manually operable means having a predetermined mode of operation for controlling said power steering means, a single source of pressure fluid for operating said steering means and for effecting stiffening and relaxing of said spring means, and valve means for controlling the action of said pressure fluid upon said power steering means and said curve stabilization means in response to operation of said manually operable means in said predetermined mode of operation, said manually operable means and said valve means being so constructed to permit play between the manually operable means and a part of the valve means which controls the power steering means whereby the curve stabilization means is actuated before said play is fully taken up for actuation of said power steering means when said manually operable means is actuated.

References Cited in the file of this patent

UNITED STATES PATENTS

| | | |
|---|---|---|
| 2,260,102 | Freret | Oct. 21, 1941 |
| 2,735,691 | Carlson | Feb. 21, 1956 |
| 2,757,938 | Crowder | Aug. 7, 1956 |
| 2,804,311 | Pobanz | Aug. 27, 1957 |
| 2,827,974 | Frank | Mar. 25, 1958 |